May 16, 1933.  A. H. M. BASART  1,909,801
VARIABLE SPEED GEAR
Filed June 16, 1931
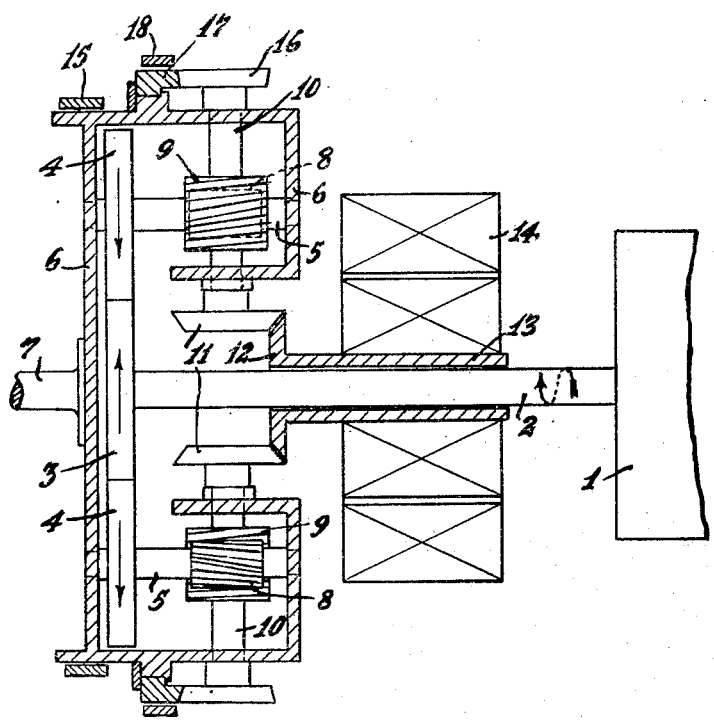
Antonius Hendrikus Marie Basart
INVENTOR
BY
ATTORNEY Patented May 16, 1933

1,909,801

UNITED STATES PATENT OFFICE

ANTONIUS HENDRIKUS MARIE BASART, OF THE HAGUE, NETHERLANDS

VARIABLE SPEED GEAR

Application filed June 16, 1931, Serial No. 544,731, and in the Netherlands June 18, 1930.

The invention relates to a variable speed gear comprising an auxiliary gear operated by a variable speed motor or other driving means, with the aid of which the driven shaft during operation can be rotated with respect to the driving shaft, but said auxiliary gear otherwise preventing this relative rotation by self-braking.

The present invention has for its object to obtain a simple construction, which can be easily mounted, at the same time it can be used as a starting device for the driven motor. Moreover there is the possibility to use the motor-compression as brake power for the motorcar.

According to the invention the auxiliary gear consists of two shafts, crossing each other at right angles and mutually interacting by worm and wormwheel or by helical gear wheels, which shafts are rotatably mounted respectively radial and parallel to the driving shaft in a housing fixed on one of the mainshafts, moreover one of said shafts crossing each other at right angles is connected to the variable speed motor and the other by means of a planetary gear to the other mainshaft.

In order to obtain for motorcars such a decrease of speed, that the brake power of the motor delivers sufficient brake force to the driven shaft and consequently to the wheels, according to the invention a bevel gear wheel can be placed at the end of each of the radial shafts projecting outside the housing which gear wheels engage a lockable rim of gear wheel situated around the housing and coaxially with the axis of rotation of same. By the locking of this rim of gear wheel a rotating motion of the radial shafts takes place and consequently a rotation of the planetary pinions with respect to the housing, by which relative motion the rotation of the driven shaft is transmitted in an accelerated way on to the driving shaft.

The accompanying drawing schematically represents a section of the arrangement according to the invention.

A toothed wheel 3 is fixed on the driving shaft, being in turn connected to a motor 1. This toothed wheel 3 engages toothed wheels 4, fixed on shafts 5 rotatably mounted in a housing 6, which is rigidly connected with the driven shaft 7.

A wormwheel 8 is fixed on each of the shafts 5, for engaging a worm 9 fixed on a shaft 10, radially and rotatably mounted in the housing 6. At the side of shaft 2 each of the radial shafts 10 is provided with a bevel gear wheel 11, which gear wheels engage a bevel gear wheel 12, placed at the end of a hollow shaft 13, surrounding the driving shaft 2.

The armature of a variable speed electric motor 14 is fixed on this shaft 13.

It will be clear that, by the rotation of shaft 2, this shaft by means of the toothed wheels 3 and 4 will try to rotate the shafts 5, which however is impossible, by reason of the worm- and wormwheel gears 8, 9 preventing such. In consequence the entire housing 6 will be taken along in rotation and thus the shaft 7 will be rotated at the same speed as the shaft 2.

In normal conditions the armature of the electro-motor 14 will be rotated as well.

When this electro-motor is started (brought under current) and when it obtains a higher speed than the shaft 2, the worm- and wormwheel gears 8, 9 will come into action, consequently the shafts 5 and the planetary pinions 4 will rotate with respect to the housing 6, which causes a retardation of the movement of the driven shaft 7.

Thus by running the electro-motor faster or slower, the speed of the shaft 7 can be varied with respect to the shaft 2. In this manner by regulating the speed of the electro-motor, every speed can be given to the driven shaft, i. e. from the speed of the driving shaft down till the speed is zero.

Moreover the electro-motor 14 can be used for the starting of the driving motor 1. For that purpose a brakeband 15 is provided, with which the housing 6 can be locked.

If the electro-motor is started when the driving motor 1 is stopped, the rotation of the electro-motor will be transmitted by means of the bevel gear wheels 12, 11 and the worm- and wormwheel gears 9, 8 on to the planet pinions 4 and from there on to the toothed wheel 3 and consequently on to the shaft 2 and the motor 1. This rotation will take place in the normal direction of rotation as indicated by the arrows.

The arrangement is made suitable also to obtain, by the application on motor cars, such a large difference of speed between the motorshaft 2 and the transmission shaft 7 that by switching off the ignition of the motor, sufficient brake force can be applied on the car by compression.

For this purpose bevel gear wheels 16 are placed at the end of each of the radial shafts 10 projecting outside the housing 6, which gear wheels engage a rim of gear wheel 17 mounted coaxially with the entire arrangement, but rotatably with respect to the housing 6. This rim of gear wheel can however be locked by means of a brakeband 18.

In case it is intended to use the motor 1 as a brake device, after switching off the ignition, the brakeband 18 is put into action consequently locking the rim of gear wheel 17. As the shaft 7 and consequently the housing 6 rotates, the bevel gear wheels 16 and with that also the radial shafts 10 will rotate with respect to the housing by the movement along the rim of gear wheel 17.

Consequently the worm and worm wheel gears 8, 9 are brought into action, so that the planetary pinions 4 and the toothed wheel 3 and consequently the motorshaft 2 are driven at a higher speed in the direction of the arrows.

For the starting of the motor also a separate transmission gear can be placed between the electro-motor and the driving motor.

I claim:

1. A variable speed gear, including the combination, with a motor provided with a main driving shaft having a driving gear rigidly fixed thereon, and a distinct driven shaft axially aligned with said driving shaft, of a worm-wheel housing rigidly secured upon said driven shaft so as to be rotatable therewith and carrying a rotatable gear shaft parallel with said main driving shaft, a driven gear fixed upon said gear shaft and meshing with said driving gear so as to be driven thereby, a worm gear also fixed upon said gear shaft, a second motor of variable speed provided with a shaft carrying a bevel gear fixed thereon, the axis of which motor coincides with the axis of said main driving shaft, a rotatable worm mounted in said housing and meshing with said worm gear so as to drive the same when rotated, which worm has a bevel gear rigidly associated therewith meshing with said first bevel gear and has the axis thereof disposed transversely to the axes of the main shaft and said worm gear shaft, and means associated with said housing for braking rotation of the same and said driven shaft.

2. A variable speed gear, including the combination, with a motor provided with a main driving shaft having a driving gear rigidly fixed thereon, and a distinct driven shaft axially aligned with said driving shaft, of a worm-wheel housing rigidly secured upon said driven shaft so as to be rotatable therewith and carrying a rotatable gear shaft parallel with said main driving shaft, a driven gear fixed upon said gear shaft and meshing with said driving gear so as to be driven thereby, a worm gear also fixed upon said gear shaft, a second motor of variable speed provided with a shaft carrying a bevel gear fixed thereon, the axis of which motor coincides with the axis of said main driving shaft, a rotatable worm mounted in said housing and meshing with said worm gear so as to drive the same when rotated, which worm has a bevel gear rigidly associated therewith meshing with said first bevel gear and has the axis thereof disposed transversely to the axes of the main shaft and said worm gear shaft, and means associated with said housing for braking rotation of the same and said driven shaft, including an independently rotatable gear concentrically disposed with respect to the driving shaft and said housing, a relatively smaller gear meshing with said independent gear and rigidly associated with said transversely disposed worm so as to be rotatable therewith, and a brake member adapted to be applied to said independent gear.

3. A variable speed gear, including the combination, with a motor provided with a main driving shaft having a driving gear rigidly fixed thereon, and a distinct driven shaft axially aligned with said driving shaft, of a worm-wheel housing rigidly secured upon said driven shaft so as to be rotatable therewith and carrying a pair of rotatable gear shafts parallel with said driving shaft, driven gears individually fixed upon said gear shafts and meshing with said driving gear so as to be driven thereby, worm gears also individually fixed upon said gear shafts, a second motor of variable speed provided with a shaft carrying a bevel gear rigidly fixed thereon, the axis of which motor coincides with the axis of said driving shaft, radially disposed rotatable worms mounted in said housing and individually meshing with said worm gears so as to simultaneously drive the same when rotated, which worms have individual bevel gears rigidly associated therewith and meshing with said first bevel gear, and means associated with said housing to brake rotation of the same and said driven shaft.

4. A self-braking variable speed gear according to claim 1, wherein the worm-wheel housing is provided with a braking gear adapted to be released and locked thereon, and an auxiliary gear is mounted upon the worm shaft meshing with said braking gear.

5. A self-braking variable speed gear according to claim 3, wherein the worm-wheel housing is provided with a braking gear, and auxiliary gears are mounted upon the worm shafts meshing with said braking gear.

In testimony whereof I affix my signature.

ANTONIUS HENDRIKUS MARIE BASART.